US010604295B1

(12) United States Patent
Daboub

(10) Patent No.: US 10,604,295 B1

(45) Date of Patent: Mar. 31, 2020

(54) HIGH-SPEED PRINT-AND-APPLY LABEL APPLICATOR

(71) Applicant: National Presort, Inc., Fort Worth, TX (US)

(72) Inventor: Brent Daboub, Fort Worth, TX (US)

(73) Assignee: National Presort, Inc., Fort Worth, TX (US)

(*) Notice: Subject to any disclaimer, the term of this patent is extended or adjusted under 35 U.S.C. 154(b) by 0 days.

(21) Appl. No.: 16/051,630

(22) Filed: Aug. 1, 2018

Related U.S. Application Data

(63) Continuation-in-part of application No. 15/788,623, filed on Oct. 19, 2017.

(60) Provisional application No. 62/410,191, filed on Oct. 19, 2016.

(51) Int. Cl.

| | |
|---|---|
| ***B32B 41/00*** | (2006.01) |
| ***B65C 9/36*** | (2006.01) |
| ***B65C 1/02*** | (2006.01) |
| ***B65C 9/44*** | (2006.01) |
| ***B65C 9/18*** | (2006.01) |
| *B65C 9/00* | (2006.01) |

(52) U.S. Cl.

CPC ................ *B65C 9/36* (2013.01); *B65C 1/021* (2013.01); *B65C 9/1865* (2013.01); *B65C 9/44* (2013.01); *B65C 2009/0003* (2013.01); *B65C 2009/0009* (2013.01)

(58) Field of Classification Search

CPC ........... B65C 9/36; B65C 9/1865; B65C 9/44; B65C 1/021; B65C 2009/0003; B65C 2009/0009

USPC ........................... 156/64, 350, 351, 378, 379

See application file for complete search history.

(56) References Cited

U.S. PATENT DOCUMENTS

| | | | | |
|---|---|---|---|---|
| 8,228,195 | B2 | 7/2012 | Ford et al. | |
| 9,352,872 | B2 | 5/2016 | Wojdyla et al. | |
| 2004/0144497 | A1* | 7/2004 | Bixen | B65C 9/1884 156/556 |
| 2006/0082446 | A1 | 4/2006 | Dods | |
| 2008/0303639 | A1* | 12/2008 | Ford | G06K 17/00 340/10.51 |

* cited by examiner

*Primary Examiner* — Michael N Orlando
*Assistant Examiner* — Joshel Rivera
(74) *Attorney, Agent, or Firm* — James E. Walton

(57) ABSTRACT

A high-speed print-and-apply label applicator includes a conveyor system, a control and monitoring system, a label web feeding assembly, a label printer and encoder system, and a tamp pad assembly driven by a linear motor having a shaft that is formed at least partially by a composite material. A flexible applicator may be secured to the leading edge of the tamp pad and extends at least partially over the generally horizontal surface.

18 Claims, 7 Drawing Sheets

HIGH-SPEED PRINT-AND-APPLY LABEL APPLICATOR

CROSS-REFERENCE TO RELATED APPLICATIONS

This application is a continuation-in-part of U.S. patent application Ser. No. 15/788,623, filed Oct. 19, 2017, titled "High-Speed Print-and-Apply Label Applicator," which claims priority to U.S. Provisional Patent Application No. 62/410,191, filed 19 Oct. 2016, "High-Speed Print-and-Apply Label Applicator," both of which are incorporated herein by reference for all purposes.

BACKGROUND

1. Technical Field

The present application relates to a systems and methods for labeling packages.

2. Description of Related Art

High-speed print-and-apply label applicator systems have been around for many years. These systems allow for high-speed labelling of packages as the packages pass by on a continuous conveyer system. These label applicator systems generally consist of a control and monitoring system, a label printer and encoder system, a tamp assembly, and a conveyor system. The control and monitoring system monitors the system during the labeling of packages and allows the operator to input commands and other operational parameters into the label applicator system. The label printer and encoder system prints and encodes the labels as directed by the control and monitoring system. Packages are delivered to the tamp assembly by the conveyor system, so that the tamp assembly can apply the labels to the packages.

Currently the number of packages that can be processed in a given timeframe is restricted by the speed of the tamp assembly. These label applicator systems are typically driven by pneumatic cylinders, rotary stepper motors, and/or rotary servo motors, all of which limit the speed at which the packages can be labelled. Although there have been great strides in the area of high-speed print-and-apply label applicator systems, significant shortcomings remain.

BRIEF DESCRIPTION OF THE DRAWINGS

The novel features believed characteristic of the system of the present application are set forth in the present application. However, the system itself, as well as a preferred mode of use, and further objectives and advantages thereof, will best be understood by reference to the following detailed description when read in conjunction with the accompanying drawings, wherein.

Figure 1:
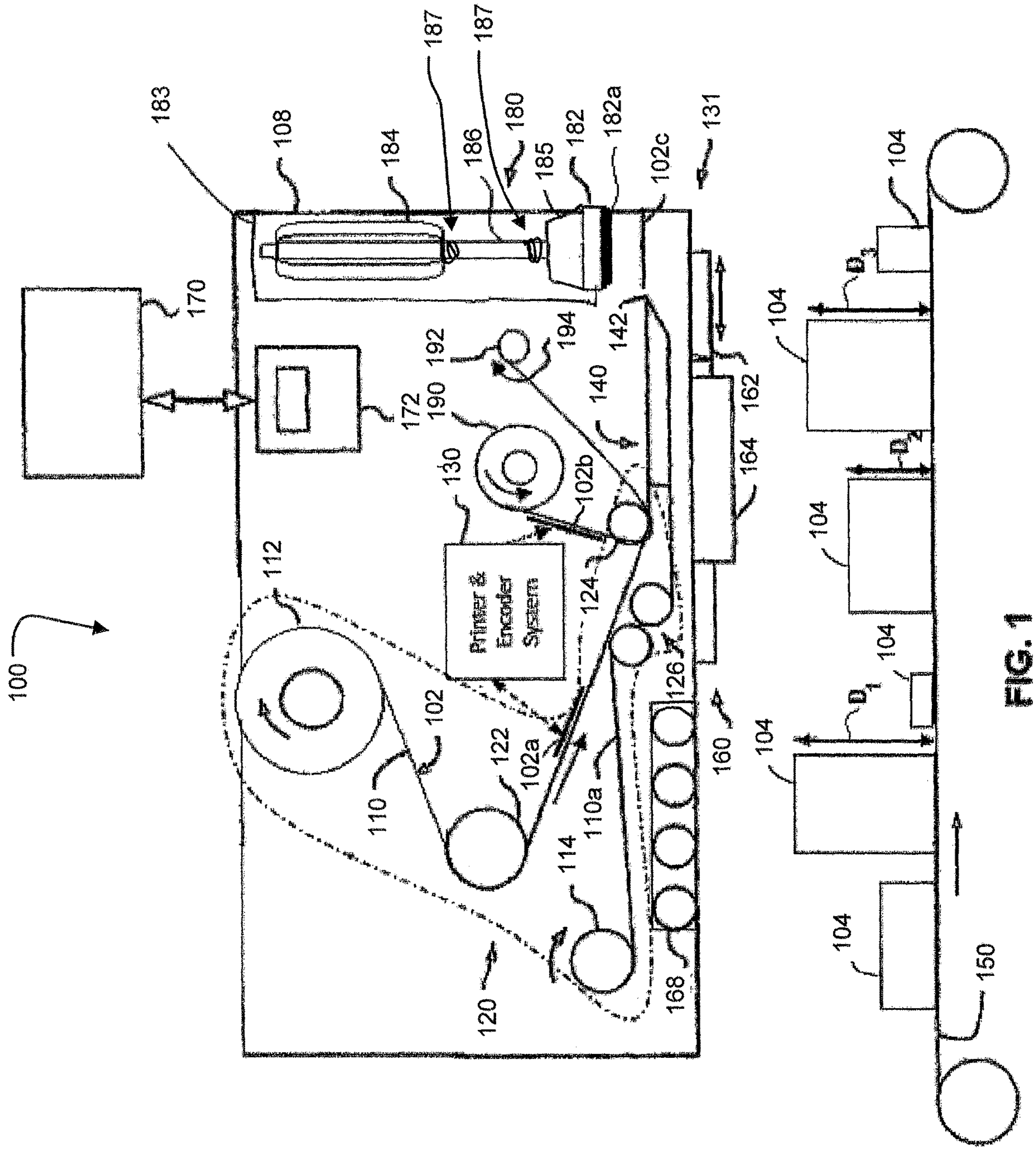
FIG. 1 is a schematic view of the preferred embodiment of a label applicator according to the present application.

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, combinations, and alternatives falling within the spirit and scope of the present application.

DETAILED DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present application, the devices, members, apparatuses; etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The use of the term "package" is meant to mean any article, such as, but not limited to, boxes, envelopes, containers, books, magazines, DVD's, CD's, and includes any item or article that can be placed on a conveyer system and/or under a label tamp assembly for labeling purposes.

Referring now to FIG. 1 in the drawings, the preferred embodiment of a high-speed print-and-apply label applicator 100 according to the present application is illustrated. Label applicator 100 allows for the high-speed printing and application of labels 102 from a web of labels 110 onto packages 104. Packages 104 may be of the same size and shape, or as is shown, may be of various sizes and shapes. Label applicator 100 includes a control and monitoring system 170, a label web feeding assembly 120, a label printer and encoder system 130, a label rejection assembly 160, a tamp pad assembly 180, and a conveyor system 150. However, it will be appreciated that other embodiments of label applicator 100 may have more or fewer components.

The components for label applicator 100 are preferably mounted or secured in a frame assembly 108. It will be appreciated that label applicator 100 may also be used in conjunction with a wide variety of package sorting machines, parcel management machines, and various other parcel encoding systems.

Control and monitoring system 170 of label applicator 100 allows for the monitoring and control of label applicator 100, and in some embodiments, also allows for the control and monitoring conveyor system 150, either directly or via communication with a system controller of conveyor system 150. It will be appreciated that control and monitoring system 170 includes one or more monitors and/or displays, CPU's, ROM chips, RAM chips, USB ports, Ethernet and/or Internet connectivity, etc., and is conductively coupled to a user interface 172 and/or a system monitoring panel 168. User interface 172 includes one or more switches, indicators, touch screens, keyboards, touchpads, and/or other input and/or output devices. It will be appreciated that user interface 172 may also be and/or include computers, tablet computers, remote controls, smart phones, and/or other personal handheld electronic devices. System monitoring panel 168 includes of one or more air pressure gauges and/or other operational indicators. In some embodiments, users may access control and monitoring system 170 remotely, which may be conducted through a computer network, another computer, smart phone, tablet, other label applicator systems, and/or other electronic devices.

Label web feeding assembly 120 preferably includes one or more supply rolls 112, one or more guide rollers 122, one or more joining guide rollers 124, one or more drive and nip roller assemblies 126, and one or more web rewind rolls 114. In addition to the components mentioned above, other components may be used, depending upon the desired application. Any of the aforementioned parts are capable of motorization to facilitate the winding and unwinding of web 110 and/or the rewinding of scrap web 110*a*. In the embodiment of FIG. 1, drive and nip roller assembly 126 pulls scrap web 110*a*, thereby causing web 110, along with a joined label 102*c*, to pass around a peel tip 142 of a peeler member 140. In embodiments that have labels 102 that require cutting, label web feeding assembly 120 may include a cutting assembly operably associated with peeler member 140.

As shown in the embodiment of FIG. 1, label printer and encoder system 130, also referred to herein as printer system 130, is preferably an RFID encoder and a thermal printer. However, in other embodiments printer system 130 may be a thermal printer, ink printer, other type of printer, and/or applicator. As shown in FIG. 1, labels 102 are RFID labels. However, in other embodiments it should be appreciated that labels 102 may be formed of paper, plastic, nylon, vinyl, or any other type of suitable label materials. In the embodiment of FIG. 1, labels 102 are discrete self-adhesive labels; however, other embodiments may use labels that require cutting and adhesive for fixation to the packaging.

In some applications, a secondary label 102*b* may be required. In such applications, secondary label 102*b* is fed from a secondary label supply roller 190 that feeds secondary label 102*b* into printer system 130 for printing and/or processing. A secondary label rewind roll 192 collects the secondary scrap web 194. Secondary label 102*b* may be printed or non-printed, and may be made of paper, plastic, nylon, vinyl, or any other type of suitable label materials. In addition, secondary label 102*b* may include a printed or non-printed clear protective film. Printer system 130 can print secondary label 102*b* using any means such as thermal printing, ink or other method. Secondary label 102*b* joins label 102*a* at joining guide roller 124, then joined label 102*c* moves through to an applicator system 131.

Applicator system 131 generally consists of peeler member 140 and peel tip 142, but may also include a label cutter, from which joined label 102*c* is separated from web 110. After separation, joined label 102*c* will either be taken up by label tamp assembly 180, or be received by a label rejection assembly 160. Label rejection assembly 160 includes an accumulation pad 162 and a label rejection driving mechanism 164. Accumulation pad 162 is where defective joined labels 102*c* accumulate. Label rejection driving mechanism 164 may also include one or more linear motors. Applicator system 131 may contain additional heat dissipating technology, either active or passive.

Tamp pad assembly 180 includes a linear motor 184, a slider shaft 186, a tamp pad 182, an applicator plate 182*a*. Tamp pad assembly 180 is a high-speed label application assembly that extends and retracts tamp pad 182. Tamp pad assembly 180 may include one or more air intake hoses and/or fans located near tamp pad assembly 180 to provide air suction as required to hold labels as needed. In the preferred embodiment, tamp pad 182 is formed from a polyurethane foam pad covered by and/or coated with a very thin sheet or layer of ultra-high-molecular-weight (UHMW) polyethylene material and/or coating to reduce friction and aid in the rapid transfer of label 102*c* to package 104.

Label applicator 100 includes a wide variety of sensors, probes, bar code readers, and/or scales to facilitate the processing and labeling of packages 104. As packages 104 travel along conveyor system 150, the weight, dimensions, and other physical parameters of each package 104, including the label height D1, D2, and D3, are determined by various dimensioning sensors and other sensors. This package data is transmitted to control and monitoring system 170, which in turn, sends appropriate control signals to linear motor 184.

Linear motor 184 is selectively configured to have a reduced mass and is capable of moving shaft 186 at speeds of up to at least 7.3 meters per second and at accelerations of over 780 meters per second squared. The linear motor available from LinMot™ under Part No. 0150-2549 (PS01-37Sx60-HP-N-AGI) is particularly well suited for this application. Linear motor 184 slides along a high-performance slider. The slider available from LinMot™ under Part No. 0150-1510 (PL01-20x600/540-HP) is particularly well suited for this application. Specifically, shaft 186 is formed at least partially from a relatively lightweight, high-strength, composite material, preferably a carbon fiber material. This allows for very short positioning times and very high cycle rates. These performance characteristics far exceed those possible with prior-art systems. By utilizing linear motor 184 and selectively configured shaft 186, the height D1, D2, D3 of packages 104 may vary from 0" to 18". In addition, by utilizing linear motor 184, packages 104 may be spaced more closely together than prior-art systems, primarily because of the speed, stroke capabilities, and other operational parameters of the linear motor 184. By being able to space packages closer together, increased package throughput is achieved. It will be appreciated that multiple linear motors may be utilized by system 100. Linear motor 184 may include various cooling and/or lubrication systems and ensure that linear motor 184 operates reliably and efficiently.

In addition, linear motor 184 and/or shaft 186 may include one or more magnetic springs and/or compression springs, such as a compression spring 187, to assist in the deceleration of shaft 186 and applicator plate 182*a* as shaft 186 and applicator plate 182*a* move upward toward the resting position of shaft 186, and to assist in the efficient operation of shaft 186 as shaft 186 moves through repeated stroke cycles. Compression springs 187 may be located adjacent the home (retracted) position of shaft 186 or the lower (extended) position of shaft 186. In addition, it will be appreciated that either linear motor 184 or shaft 186, or both, may serve as the moving component in tamp pad assembly 180. Accordingly, compression springs 187 may be located adjacent the home (retracted) position of linear motor 184 or the lower (extended) position of linear motor 184. Furthermore, compression springs 187 may be coupled directly to linear motor 184 and/or shaft 186.

Figure 2:
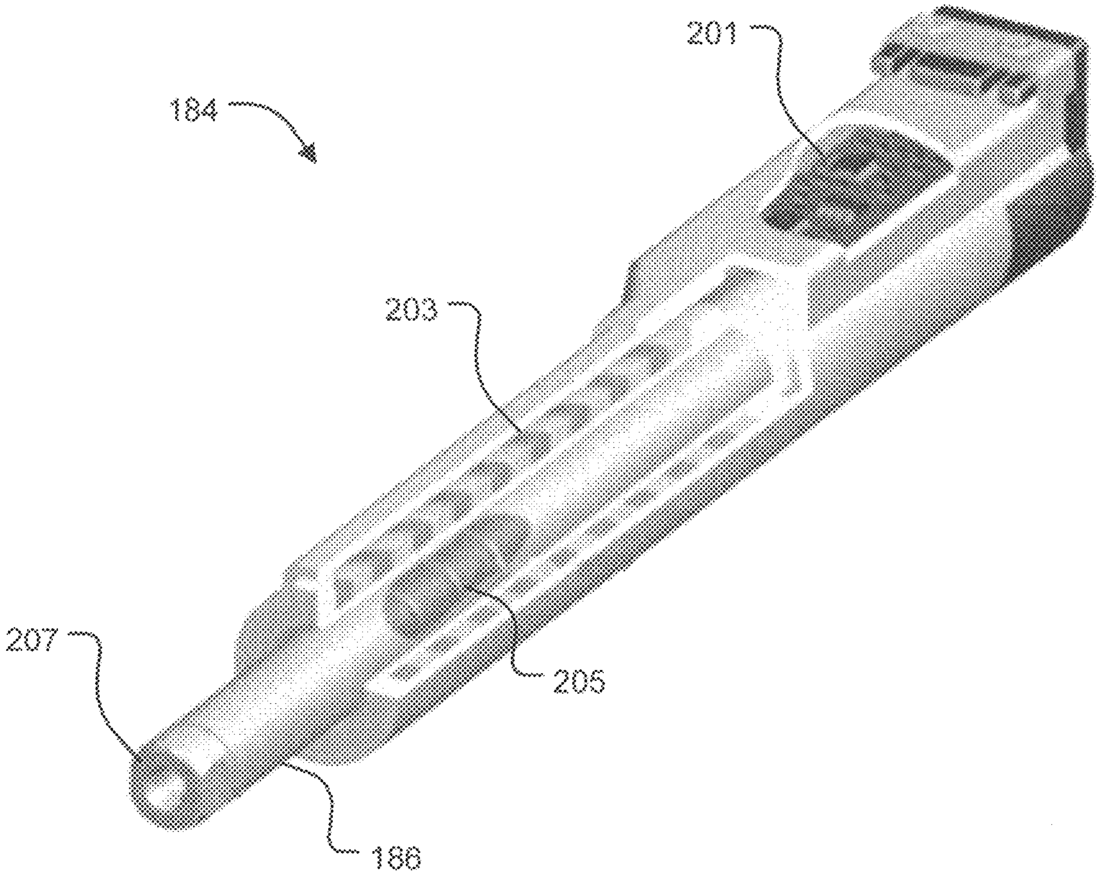
FIG. 2 is a cut-away perspective view of a linear motor of the system of FIG. 1.
Figure 3:
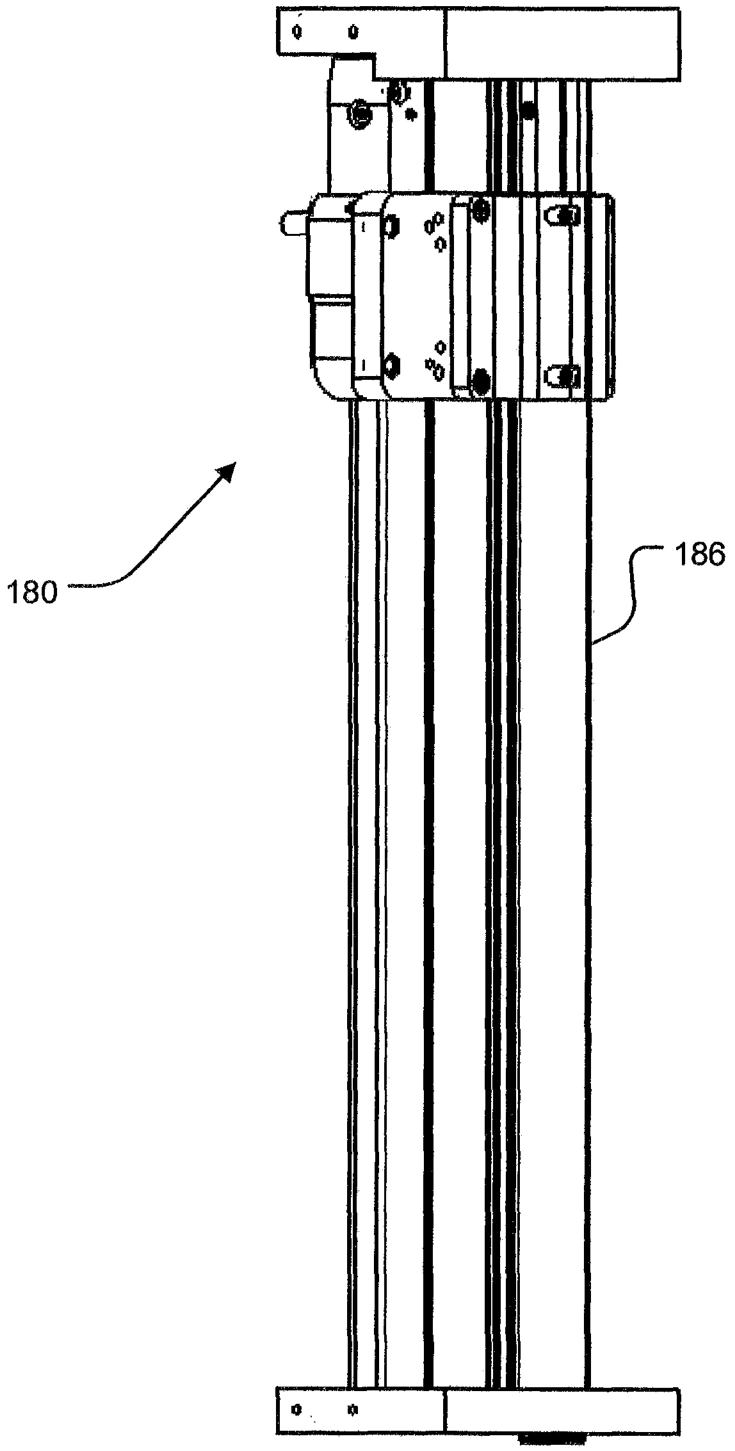
FIG. 3 is a perspective view of a tamp pad assembly of the system of FIG. 1 shown with the composite shaft in a retracted position.

Referring now also to FIG. 2 in the drawings, linear motor 184 is illustrated. In the preferred embodiment, linear motor 184 has four major components: a position and temperature sensors circuit board 201, a stator 203, a slider 205, and a payload mounting shaft 207. Tamp pad 182 is preferably connected to shaft 207. Other embodiments might use linear motors having different components.

The circuit board 201 measures and monitors the current position of the linear motor 184, not only when linear motor 184 is stopped, but also while linear motor 184 is in motion. Deviations in position are detected immediately and reported to the control and monitoring system 170. Slider 205 is preferably made of neodymium magnets that are mounted in a high-precision stainless steel tube. Stator 203 contains the motor windings for slider 205. Position capture sensors and a microprocessor circuit (not shown) for monitoring linear motor 184 are also part of linear motor 184.

One unique feature of label applicator 100 is the configuration and manner of operation of tamp pad assembly 180. Instead of moving shaft 186 at the same acceleration and velocity each stroke, linear motor 184 is configured such that the travel time of shaft 186 is the same for each stroke of shaft 186. Thus, the acceleration and velocity of shaft 186 varies dependent upon the vertical travel distance between the start position of shaft 186 and the upper surface of each package 104. In other words, tamp pad 182 moves from a start position, or first position, to the upper surface of each package 104 in the same amount of time, regardless of the height D1, D2, or D3, i.e., regardless of the vertical travel distance of tamp pad 182. In the preferred embodiment, this selected travel time of shaft 186, also referred to herein as the actuation profile of shaft 186, is 150 ms. It will be appreciated, that the actuation profile may be varied from one operational session to another. Selectively setting the actuation profile helps ensure that label 102*c* is placed onto each package 104 at a selected time and at a selected location.

In operation, the height D1, D2, and D3 of each package 104 is measured. Then, tamp pad assembly 180 actuates linear motor 184 and shaft 186 according to the selected actuation profile. This results in each label 102*c* being accurately placed on each package 104 in a set amount of time, preferably 150 ms.

Figure 4:
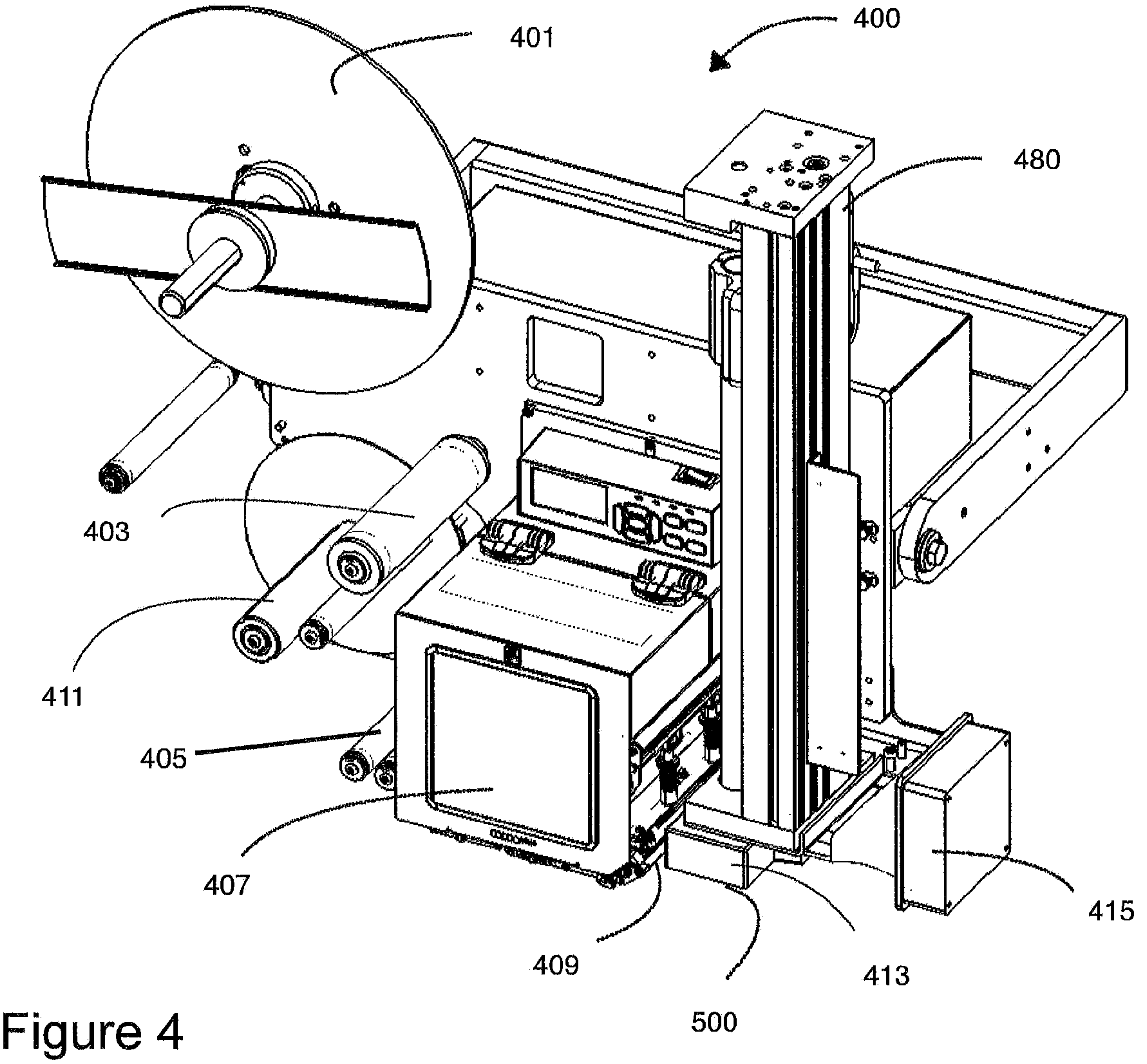
FIG. 4 is a perspective view of another embodiment of a label applicator according to the present application.
Figure 5:
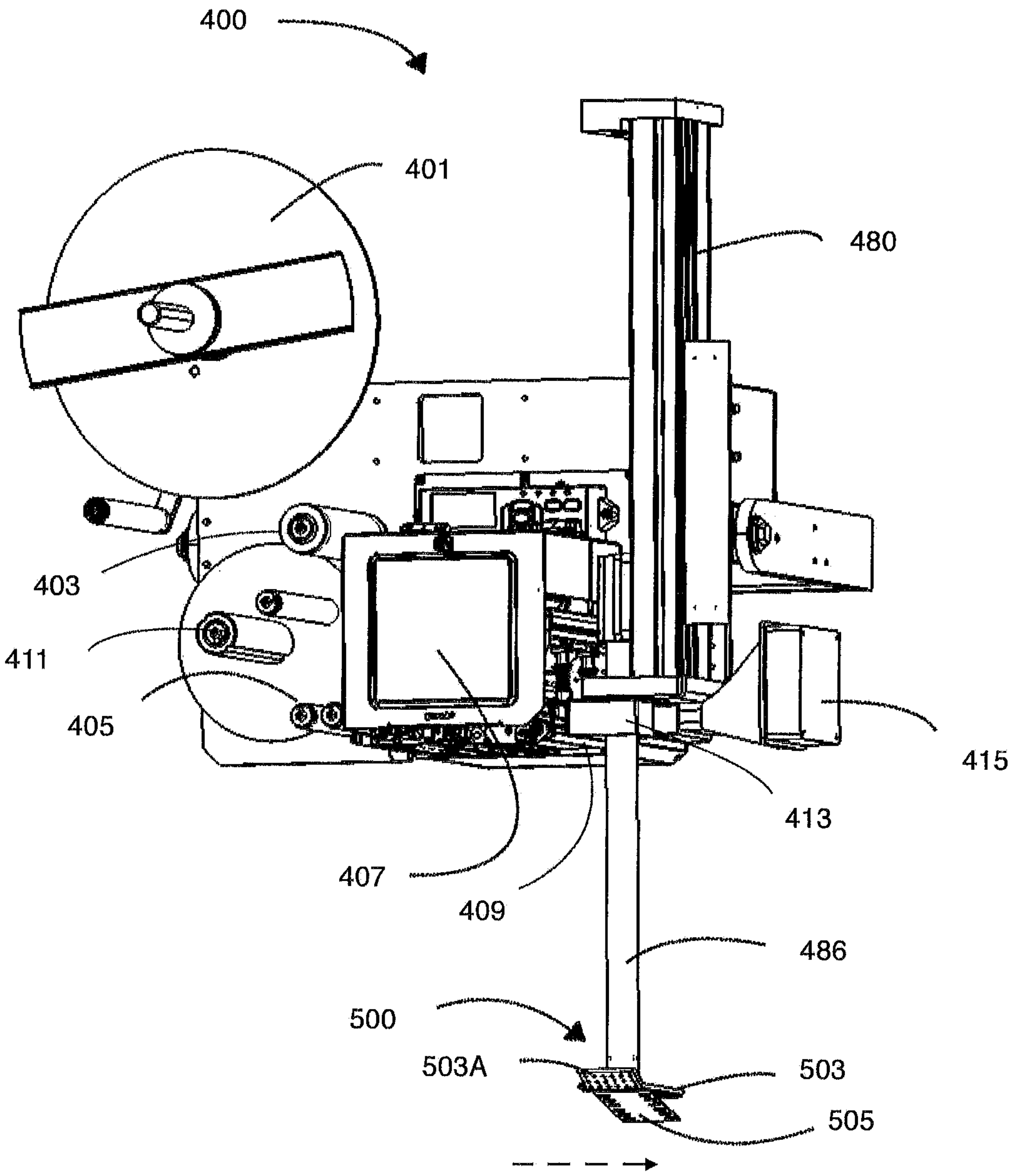
FIG. 5 is a perspective view of another embodiment of a label applicator according to the present application showing the shaft of a linear actuator of the tamp pad assembly in an extended position.

FIGS. 4 and 5 depict another embodiment of a high-speed print-and-apply label applicator 400 in accordance with the present application that operates in generally the same manner as described above. A spool holder 401 may hold a spool of tightly wound labels (not shown). The spool of labels may be unspooled over an idler roller 403 through a tension loop 405, which keeps the spool tensioned while allowing the labels to be fed to the print engine 407. Print engine 407 prints the correct information onto an individual label and then pulls the label across the label separator 409, which splits the label from the backing material, exposing the sticky, adhesive side of the label. The backing material may be spooled on roll 411. The label continues forward with its momentum and is forced up onto a tamp pad 500. The label is temporarily secured on tamp pad 500 by suction or negative pressure that is produced in a plenum or box 413 of which tamp pad 500 forms the bottom surface, by a label suction fan 415 (as described in greater detail in connection with FIG. 6). Negative pressure from fan 415 may be applied to plenum 413, and, when tamp pad 500 is in the retracted position to receive a label, as shown in FIG. 4, vacuum may be applied through apertures in tamp pad to hold the label onto the surface of tamp pad 500. Once the parcel that is to be labeled is in the correct location on the belt, the shaft 486 of linear actuator 480 moves, along with tamp pad 500 carrying the label, to the correct height (D1, D2, or D3 from FIG. 1) and applies the label onto the parcel.

Figure 6:
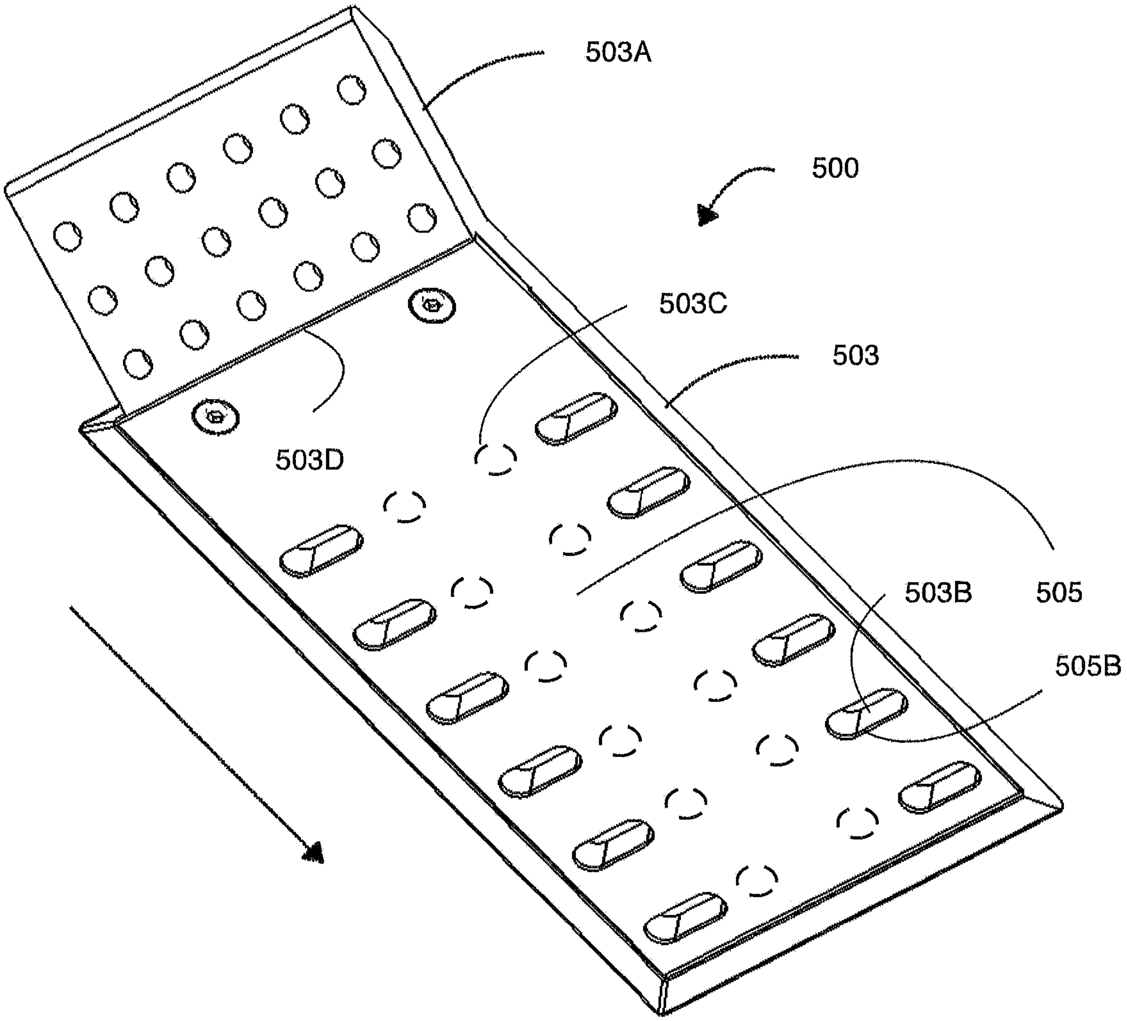
FIG. 6 is an enlarged perspective view of a tamp pad assembly of the embodiment of FIGS. 4 and 5.

FIG. 6 illustrates tamp pad assembly 500, which comprises a tamp pad 503, a label ramp 503A, and a flexible applicator 505. Tamp pad 503 and label ramp 503A preferably may be formed integrally, as a single piece of machined or stamped metal or plastic to form a relatively rigid structure that defines a generally horizontal surface for applying labels to parcels. Label ramp 503A is an upturned extension of pad 503 and provides a smooth transition for the labels that come off of the label separator (409 in FIGS. 4 and 5). A first regularly spaced array of a plurality of oblong apertures 503B may be formed in tamp pad 503. A second array of regularly spaced circular apertures 503C may be formed in tamp pad 503.

A flexible applicator 505 may be generally coextensive with tamp pad 503 and is attached to a leading edge 503D (leading in the sense that it is the first edge to encounter a parcel moving in the direction of the arrow) of tamp pad 503 by screws, adhesive or other fasteners. The unattached remainder of flexible applicator 505 may free to move relative to tamp pad 503. The flexible applicator pad may be made of a thin flexible material such as acetal polymer, that bends freely under inertial loads.

An array of oblong apertures 505B is formed in flexible applicator 505 at locations corresponding to holes 503B in tamp pad 503, so that holes 505B and 503B register or align with each other. Apertures 505B in the flexible applicator may be approximately 20% smaller in area than apertures 503B in tamp pad 503. Apertures 503B and 503C in tamp pad 503 apply suction, vacuum, or negative pressure to flexible applicator 505 to hold it flush or flat against tamp pad 503 when it is in the fully retracted position shown in FIG. 4, regardless of the presence of a label. When a label is present on tamp pad assembly 500, the suction to the label through registered apertures 503B and 505B is sufficient to hold both the label and flexible applicator 505 against tamp pad 503.

The operation of tamp pad assembly depicted in FIG. 6 is shown in FIG. 5. In FIG. 5, label applicator 400 is shown with the shaft 486 of linear actuator 480 extended and decelerated immediately before contact with a parcel. Shaft 486 of linear actuator 480 slows or decelerates moments before impacting the parcel, this change in momentum forces the flexible applicator pad 505 and the label to flex downwards. The parcel then impacts bent flexible applicator pad 505 and the label is applied by applicator pad 505 as the parcel travels down the belt and past tamp pad assembly 500. Linear actuator 480 then retracts shaft 486 and tamp pad assembly 500 upward to plenum 413, and applicator pad 505 is retained against tamp pad 503 by suction, vacuum, or negative pressure from suction fan assembly 415.

Figure 7:
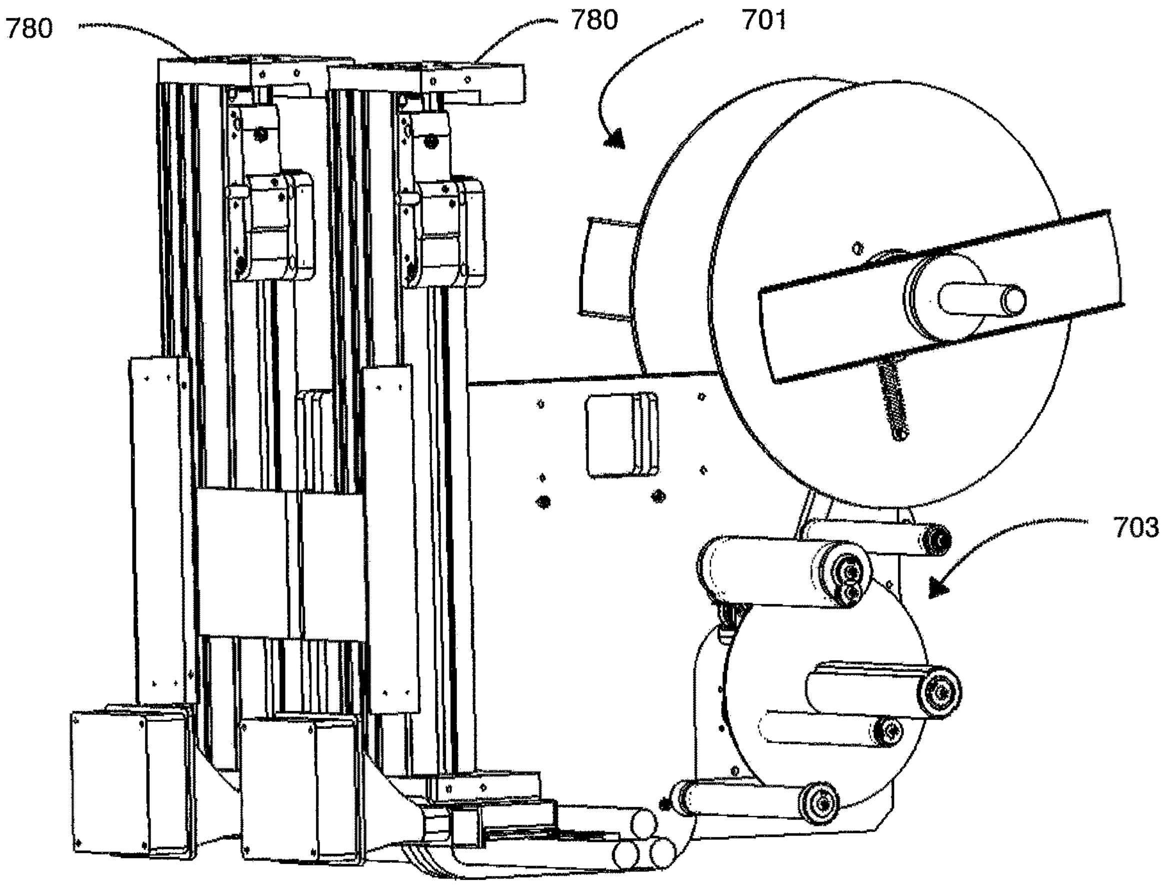
FIG. 7 is a perspective view of a very high-speed embodiment of a label applicator according to the present application.

FIG. 7 illustrates an ultra-high-speed label applicator system 700 according to an embodiment of the present application. System 700 consists of two side-by-side high speed label applicators 701, 703. Each high speed label applicators in this system 701, 703 is identical to applicator 400 depicted in FIG. 4, but without a print engine, because system 700 is configured for use with preprinted label to maximize speed at the expense of the flexibility associated with printing labels. The alignment of the two high speed label applicators is such that there is a minimal gap between the actuators 780 and associated tamp pads. The use of two applicators side-by-side increases the throughput that the labelers can handle. Placing the actuators side-by-side with a minimal gap between the tamp pads reduces the complexity and entropy in the timing of the applicator system. Tracking and locating a parcel for applying a label is simplified if the travel distance between actuators is minimized.

Figure 8:
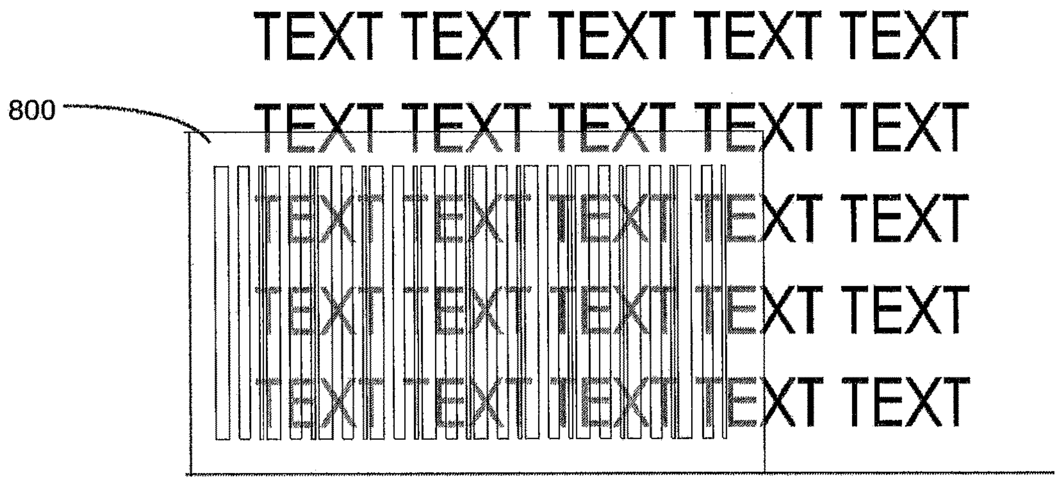
FIG. 8 is a plan view of a transparent or translucent label for use in the embodiment depicted in FIG. 7.

High-speed label applicator 700 may be configured to accept a roll of pre-printed clear labels 800 illustrated in FIG. 8. Labels 800 are transparent or at least translucent and have a sequential barcode printed in fluorescent or invisible ink. Clear labels 800 may be applied to a parcel and any pre-existing important markings on the parcel ("TEXT") to remain visible. Thus clear labels 800 permits unique labels to be applied to parcels without affecting the readability of any of any markings on the parcels.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered, combined, and/or modified, and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

I claim:

1. A tamp pad assembly for a high-speed label applicator, the tamp pad assembly comprising:
- a shaft extended and retracted by an actuator;
- a tamp pad coupled to the shaft, the tamp pad having a generally horizontal surface with a leading edge;
- an upturned label ramp at the leading edge of the tamp pad; and
- a flexible applicator secured to the leading edge of the tamp pad and extending at least partially over the generally horizontal surface.

2. The tamp pad assembly according to claim 1, wherein the flexible applicator is generally coextensive with the horizontal surface of the tamp pad.

3. The tamp pad assembly according to claim 1, further comprising:
- a plurality of tamp pad apertures formed in the tamp pad, wherein, upon application of negative pressure to the tamp pad apertures, the applicator is held against the horizontal surface of the tamp pad.

4. The tamp pad assembly according to claim 3, further comprising:
- a vacuum source operably connected to the tamp pad to apply negative pressure to the tamp pad apertures and to the flexible applicator when the shaft and tamp pad are in a retracted position.

5. The tamp pad assembly according to claim 1, further comprising:
- a plurality of applicator apertures formed in the flexible applicator;
- a plurality of first tamp pad apertures, the first tamp pad apertures applying suction to the applicator; and
- a plurality of second tamp pad apertures, larger in area than the applicator apertures, wherein the applicator apertures register with the second tamp pad apertures to apply suction to a label on the applicator.

6. The tamp pad assembly according to claim 5, further comprising:
- a vacuum source operably connected to the tamp pad to apply negative pressure to the first and second tamp pad apertures.

7. The tamp pad assembly according to claim 1, wherein the flexible applicator pad is configured to move relative to the tamp pad as the shaft extends and retracts.

8. The tamp pad assembly according to claim 1, further comprising:
- a second shaft extended and retracted by an actuator;
- a second tamp pad coupled to the shaft, the tamp pad having a generally horizontal surface with a leading edge; and
- a second flexible applicator secured to the leading edge of the tamp pad and extending at least partially over the generally horizontal surface, wherein the shafts, tamp pads, and flexible applicators are minimally spaced apart.

9. The tamp pad assembly according to claim 1, wherein fed through the high-speed label applicator are at least partially transparent.

10. A high-speed print-and-apply label applicator, comprising:
- a control and monitoring system;
- a label web feeding assembly;
- a conveyor system for conveying one or more packages; and
- a tamp pad assembly comprising:
  - a shaft moved between extended and retracted positions by an actuator; and
  - a tamp pad coupled to the shaft, the tamp pad having a generally horizontal surface having a leading edge;
- an upturned label ramp at the leading edge of the tamp pad; and
- a flexible applicator secured to the leading edge of the tamp pad and extending at least partially over the generally horizontal surface.

11. The label applicator according to claim 10, wherein the flexible applicator is generally coextensive with the horizontal surface of the tamp pad.

12. The label applicator according to claim 10, further comprising:
- a plurality of tamp pad apertures formed in the tamp pad, wherein, upon application of negative pressure to the tamp pad apertures, the applicator is held against the horizontal surface of the tamp pad.

13. The label actuator according to claim 12, further comprising:
- a vacuum source operably connected to the tamp pad to apply negative pressure to the tamp pad apertures and to the flexible applicator when the shaft and tamp pad are in a retracted position.

14. The label applicator according to claim 10, further comprising:

a plurality of applicator apertures formed in the flexible applicator;

a plurality of first tamp pad apertures, the first tamp pad apertures applying suction to the applicator; and a plurality of second tamp pad apertures, larger in area than the applicator apertures, wherein the applicator apertures register with the second tamp pad apertures to apply suction to a label on the applicator.

15. The label actuator according to claim 14, further comprising:

a vacuum source operably connected to the tamp pad to apply negative pressure to the first and second tamp pad apertures.

16. The tamp pad assembly according to claim 10, wherein the flexible applicator pad is configured to move relative to the tamp pad as the shaft extends and retracts.

17. The tamp pad assembly according to claim 10, further comprising:

a second shaft extended and retracted by an actuator;

a second tamp pad coupled to the shaft, the tamp pad having a generally horizontal surface with a leading edge; and a second flexible applicator secured to the leading edge of the tamp pad and extending at least partially over the generally horizontal surface, wherein the shafts, tamp pads, and flexible applicators are minimally spaced apart.

18. The tamp pad assembly according to claim 10, wherein fed through the high-speed label applicator are at least partially transparent.

* * * * *